United States Patent
Greene (10) Patent No.: US 11,799,713 B2
(45) Date of Patent: *Oct. 24, 2023

(54) TIMESTAMP-BASED ASSOCIATION OF IDENTIFIERS

(71) Applicant: Parrable Inc., New York, NY (US)

(72) Inventor: Justin E. Greene, New York, NY (US)

(73) Assignee: PARRABLE INC., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/918,844

(22) Filed: Jul. 1, 2020

(65) Prior Publication Data
US 2020/0403844 A1 Dec. 24, 2020

Related U.S. Application Data

(63) Continuation-in-part of application No. 16/697,079, filed on Nov. 26, 2019, now abandoned, which is a
(Continued)

(51) Int. Cl.
*H04L 41/0266* (2022.01)
*H04L 41/0273* (2022.01)
(Continued)

(52) U.S. Cl.
CPC ........ *H04L 41/0293* (2013.01); *G06F 16/955* (2019.01); *G06F 16/9574* (2019.01);
(Continued)

(58) Field of Classification Search
CPC ............ H04L 41/0293; H04L 41/0266; H04L 61/609; H04L 67/06; H04L 67/18; H04L 67/02; G06F 16/9574; G06F 16/955
See application file for complete search history.

(56) References Cited

U.S. PATENT DOCUMENTS 6,615,262 B2  9/2003  Schweitzer et al.
8,478,856 B2  7/2013  Williams et al.
(Continued)

FOREIGN PATENT DOCUMENTS

EP  3602970  2/2020
JP  2010-093556  4/2010
(Continued)

OTHER PUBLICATIONS

European Patent Application No. 16849578.6 Extended European Search Report dated Jun. 25, 2019.
(Continued)

*Primary Examiner* — Dhairya A Patel
(74) *Attorney, Agent, or Firm* — FisherBroyles LLP (57) ABSTRACT

Systems and methods for associating sessions of encrypted identifiers are provided. A collection of data packets received during one or more sessions within a time period may be retrieved. Each packet in the collection may be associated with a unique identifier of a respective session. An epoch time may be calculated for each of the retrieved data packets based on the determined skew and respective timestamp information of the data packet. It may be identified as to whether each of the calculated epoch times matches a previously calculated epoch time for a packet associated with a previous session or a session that has previously been associated with a selected session. The timestamp information may be associated with a browser identifier and subject to encryption/decryption by an identifier server or authorized parties.

17 Claims, 5 Drawing Sheets

Related U.S. Application Data continuation-in-part of application No. 15/469,162, filed on Mar. 24, 2017, now Pat. No. 10,715,413, which is a continuation of application No. 14/861,993, filed on Sep. 22, 2015, now Pat. No. 10,491,451.

(51) Int. Cl.

| | | |
|---|---|---|
| *H04L 67/02* | (2022.01) | |
| *H04L 67/06* | (2022.01) | |
| *G06F 16/955* | (2019.01) | |
| *G06F 16/957* | (2019.01) | |
| *H04L 61/45* | (2022.01) | |
| *H04L 67/52* | (2022.01) | |
| *G06F 21/62* | (2013.01) | |
| *H04L 101/69* | (2022.01) | |

(52) U.S. Cl.
CPC ...... *H04L 41/0266* (2013.01); *H04L 61/4547* (2022.05); *H04L 67/02* (2013.01); *H04L 67/06* (2013.01); *H04L 67/52* (2022.05); *G06F 21/6263* (2013.01); *H04L 2101/69* (2022.05)

(56) References Cited

U.S. PATENT DOCUMENTS

| | | | |
|---|---|---|---|
| 8,635,374 | B1 | 1/2014 | Pannell |
| 8,767,944 | B1* | 7/2014 | Davis ............... H04L 65/65 379/265.09 |
| 9,003,009 | B2 | 4/2015 | Williams et al. |
| 9,003,540 | B1 | 4/2015 | Johansson et al. |
| 9,342,617 | B1 | 5/2016 | Greene et al. |
| 9,398,091 | B2 | 7/2016 | Williams et al. |
| 9,420,324 | B2 | 8/2016 | Ravi |
| 9,602,366 | B1 | 3/2017 | Manin |
| 10,050,731 | B1* | 8/2018 | Martin ............... H04L 69/28 |
| 10,075,330 | B1 | 9/2018 | Pannell |
| 10,491,451 | B2 | 11/2019 | Greene |
| 10,715,413 | B2 | 7/2020 | Greene |
| 10,834,057 | B1* | 11/2020 | Ferguson ............ H04L 69/166 |
| 2003/0120789 | A1 | 6/2003 | Hepworth et al. |
| 2003/0152034 | A1 | 8/2003 | Zhang et al. |
| 2004/0111746 | A1 | 6/2004 | Hoang |
| 2006/0233106 | A1 | 10/2006 | Achlioptas |
| 2007/0255784 | A1* | 11/2007 | Takechi ............. H04L 67/14 709/203 |
| 2007/0268938 | A1* | 11/2007 | Dowd ............... H04L 69/28 370/509 |
| 2008/0127209 | A1 | 5/2008 | Gale et al. |
| 2009/0006861 | A1 | 1/2009 | Bemmel |
| 2009/0116397 | A1 | 5/2009 | Denby et al. |
| 2011/0078443 | A1* | 3/2011 | Greenstein ............ H04L 63/061 713/169 |
| 2011/0320816 | A1 | 12/2011 | Yao et al. |
| 2012/0250081 | A1 | 10/2012 | Takahashi |
| 2013/0124309 | A1 | 5/2013 | Traashahl et al. |
| 2013/0212413 | A1* | 8/2013 | Berndt ............... G06F 11/3006 713/310 |
| 2014/0059267 | A1 | 2/2014 | Lai et al. |
| 2014/0149577 | A1 | 5/2014 | Monighetti |
| 2014/0257999 | A1 | 9/2014 | Garcia-Martinez |
| 2015/0074258 | A1 | 3/2015 | Ferreira et al. |
| 2015/0118991 | A1* | 4/2015 | Chung ............... H04W 12/084 455/406 |
| 2015/0200863 | A1 | 7/2015 | Wu |
| 2016/0323565 | A1 | 11/2016 | van Baarsen |
| 2016/0330012 | A1 | 11/2016 | Liu |
| 2017/0013070 | A1 | 1/2017 | Comstsock et al. |
| 2017/0013403 | A1 | 1/2017 | Sen |
| 2017/0085522 | A1 | 3/2017 | Greene |
| 2017/0272465 | A1 | 9/2017 | Steele |
| 2018/0098196 | A1 | 4/2018 | Dal Santo et al. |
| 2018/0278509 | A1 | 9/2018 | Greene |
| 2020/0112442 | A1 | 4/2020 | Wentz |
| 2020/0128083 | A1 | 4/2020 | Fieau et al. |

FOREIGN PATENT DOCUMENTS

| | | |
|---|---|---|
| WO | WO 2017/053540 | 3/2017 |
| WO | WO 2018/175342 | 9/2018 |

OTHER PUBLICATIONS

PCT Application PCT/US2016/053065 International Search Report and Written Opinion dated Dec. 6, 2016.
PCT Application PCT/US2018/023177 International Preliminary Report on Patentability dated Sep. 24, 2019.
PCT Application PCT/US2018/023177 International Search Report and Written Opinion dated May 25, 2018.
U.S. Appl. No. 14/861,993 Office Action dated Feb. 28, 2018.
U.S. Appl. No. 14/861,993 Office Action dated Jun. 13, 2017.
U.S. Appl. No. 15/469,162 Office Action dated Oct. 21, 2019.
U.S. Appl. No. 15/469,162 Office Action dated Mar. 22, 2019.
European Patent Application No. 18770352.5 Extended European Search Report dated Dec. 8, 2020.
European Patent Application No. 16849578.6 First Examination Report dated Mar. 11, 2021.
PCT Application PCT/US2021/039887 International Search Report and Written Opinion dated Oct. 13, 2021.

\* cited by examiner

TIMESTAMP-BASED ASSOCIATION OF IDENTIFIERS

CROSS-REFERENCE TO RELATED APPLICATIONS

The present application is a continuation-in-part of U.S. patent application Ser. No. 15/469,162 filed Mar. 24, 2017, now U.S. Pat. No. 10,715,413, the present application is also a continuation-in-part of U.S. patent application Ser. No. 16/697,079 filed Nov. 26, 2019, which is a continuation of U.S. patent application Ser. No. 14/861,993 filed Sep. 22, 2015, now U.S. Pat. No. 10,491,451, the disclosure of each of the foregoing being incorporated by reference herein.

BACKGROUND ON INVENTION

Field of the Invention

The present invention generally relates to websites and applications. More specifically, the present invention relates to timestamp-based association (e.g., of the same device) of identifiers.

Description of the Related Art

The use of Internet and web resources is nearly ubiquitous throughout the industrialized world. Users generally access the Internet using any of a number of computing devices capable of communicating over a communication network, whether wirelessly or through wired connections. More specifically, the user may use an application (e.g., browser) on a computing device to access content on any of a number of webpages and websites hosted by one or more web and application servers. As used herein, references to browser and browser identifier are illustrative and should not be construed to exclude other types of applications. On the contrary, the present disclosure is applicable to and inclusive of a variety of applications.

Upon request, content related to a designated webpage may be downloaded to the user computing device, which may further render the webpage to be displayed. Such downloaded content may include a variety of different types of files, including documents, graphics, audio and video, etc., as well as related data (e.g., metadata including consent data regarding how such information is to be used and not used). The downloaded content may be stored in a browser storage. Various elements and components of a particular webpage or website may change over time (e.g., as a publisher publishes new or updated content). Some components or elements, however, remain static and unchanged. When the user leaves the webpage and later wishes to return, the browser storage allows the computing device to retrieve static, unchanged files related to the associated webpage from local memory, rather than re-downloading the same web objects when a user wishes to revisit the webpage.

Currently, browsers do not contain or expose any unique identifiers that can be accessed and used by websites. Present websites and webpages may capture data regarding the activity (e.g., repeat visits) of the user in relation to a particular webpage. Such data may include state information (e.g., preferences, shopping cart items), provide registration or authentication information (e.g., user names, passwords, addresses/locations), or otherwise track browsing history (e.g., which webpages were visited, a number of visits, when the visits occurred). Because nearly all aspects of modern life may be reflected in or otherwise involve Internet activity, however, some of the tracked data may be personally identifiable of a particular individual. Tracking mechanisms (e.g., that may or may not encompass such personally identifiable data) may therefore risk exposure of personal, confidential, and/or otherwise sensitive user information. In the interests of protecting user privacy, some jurisdictions may even have statutes or regulations restricting the type of data that may be tracked.

Meanwhile, various publishers, service providers, and related entities may be interested in obtaining statistical data regarding the unique traffic or activity in relation to a given webpage or website. Although a web server may be able to identify a number of download requests for a particular webpage, such requests may be made by the same user (or the same small set of users) or device(s). Such a metric may therefore fail to present an accurate picture of the traffic or other device activity involving the website, while using the more particularized data discussed above may risk exposure of information that is personally identifiable of a specific user.

Moreover, a browser may be used to visit multiple websites. Data is typically partitioned between different websites, as well as between different browsers. Because such different browsers generally do not communicate or exchange information, it can be quite difficult to get a full picture of how such a user may use a device to access and engage with the Internet. Further complications arise when multiple browsers are considered. A device may use different browsers and other types of applications to visit a variety of different websites and content providers. Such variety can complicate the ability to track traffic where, for example, a device may have different browsers or applications used to access the same website.

There is, therefore, a need in the art for proved systems and methods for timestamp-based association of different identifiers.

SUMMARY OF THE CLAIMED INVENTION

Embodiments of the present invention may include systems and methods for timestamp-based association of identifiers. A collection of data packets received during one or more sessions within a time period may be retrieved. Each packet in the collection may be associated with a unique identifier. An uptime (which may also be referred to as epoch time) may be calculated for each of the retrieved data packets based on the determined skew and respective timestamp information of the data packet. It may be identified as to whether each of the calculated epoch time matches a previously calculated epoch time for a packet associated with a previous session or a session that has previously been associated with a selected session. The timestamp information may be associated with a browser identifier, which may be subject to encryption/decryption by an identifier server or authorized parties. In some embodiments, both browser identifier and associated device identifier may be encrypted together into an encrypted identifier container (e.g., EID).

Further embodiments include non-transitory computer-readable storage media having embodied thereon a program executable by a processor to perform a method for session association of identifiers as described above.

DETAILED DESCRIPTION

Embodiments of the present invention allow for session association of identifiers are provided. A collection of data packets received during one or more sessions within a time period may be retrieved. Each packet in the collection may be associated with one or more unique identifiers of a respective session. An uptime—which may also be referred to as an epoch time—may be calculated for each of the retrieved data packets based on the determined skew and respective timestamp information of the data packet. It may be identified as to whether each of the calculated epoch time matches a previously calculated epoch time for a packet associated with a previous session or a session that has previously been associated with a selected session. The timestamp information may be associated with a browser identifier(s) and device identifier(s), both of which may be subject to encryption/decryption by an identifier server before storage. The encrypted identifiers may later be decrypted by authorized parties.

Figure 1:
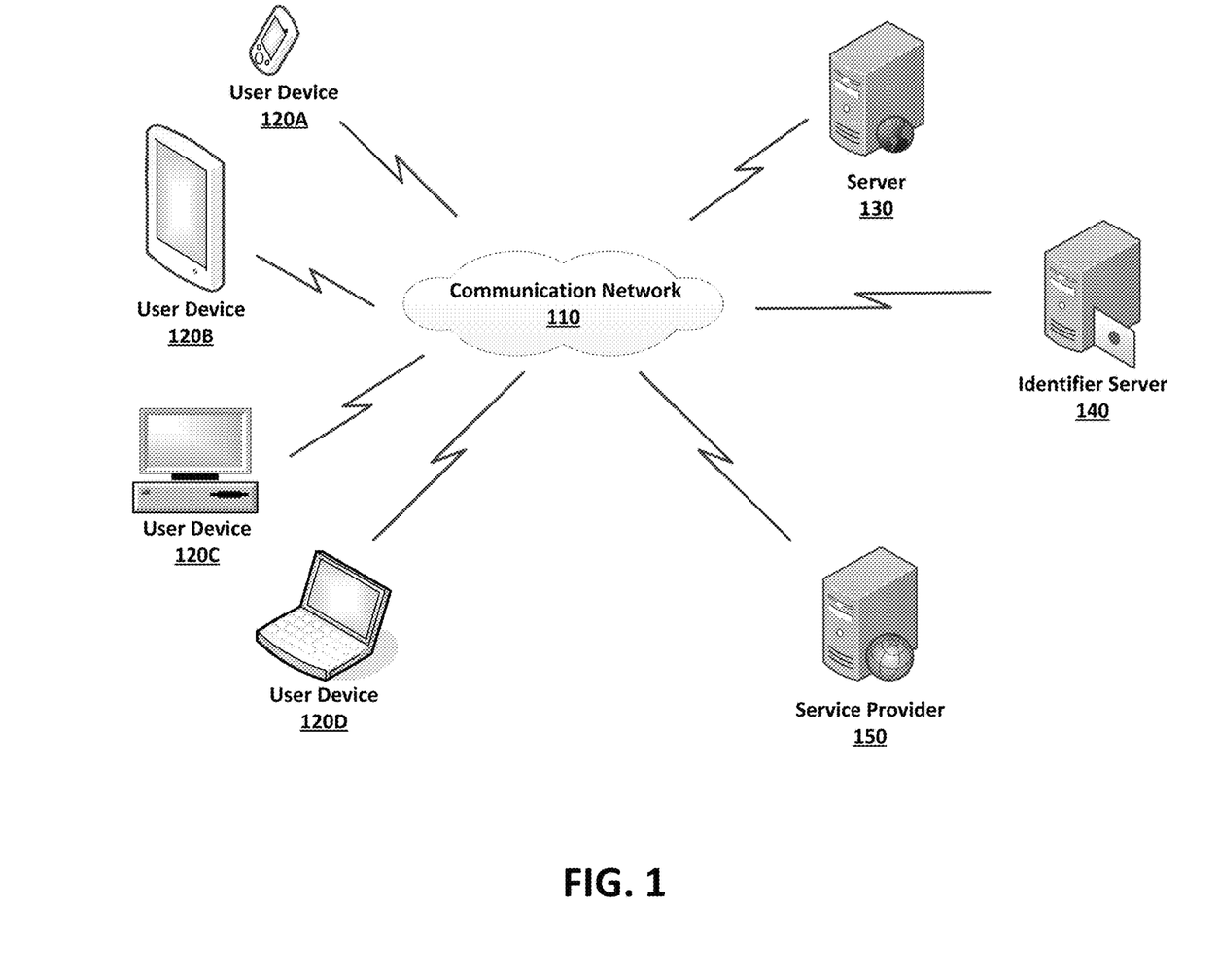
FIG. 1 illustrates an exemplary network environment in which a system for timestamp-based association of identifiers may be implemented.

FIG. 1 illustrates a network environment 100 in which a system for timestamp-based analysis of identifiers may be implemented. Network environment 100 may include a communication network 110, one or more user devices 120A-D, server 130 (e.g., web server), identifier server 140, and one or more service providers 150. Devices in network environment 100 may communicate with each other via communications network 110.

Communication network 110 may be a local, proprietary network (e.g., an intranet) and/or may be a part of a larger wide-area network. The communications network 110 may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, cellular or mobile service providers, a cable service provider, a provider of digital subscriber line (DSL) services, or a satellite service provider. Communications network 110 allows for communication between the various components of network environment 100.

Users may use any number of different electronic user devices 120A-D, such as general purpose computers, mobile phones, smartphones, smartwatches, wearable devices, personal digital assistants (PDAs), portable computing devices (e.g., laptop, netbook, tablets), desktop computing devices, handheld computing device, or any other type of computing device capable of communicating over communication network 110. User devices 120 may also be configured to access data from other storage media, such as local browser storage, memory cards, or disk drives as may be appropriate in the case of downloaded services. User device 120 may include standard hardware computing components such as network and media interfaces, non-transitory computer-readable storage (memory), and processors for executing instructions that may be stored in memory.

In addition, user devices 120 may include a variety of applications, including browser applications that allow the user to request certain webpages and other network accessible data. As used herein, references to browser and browser identifier are exemplary, and teachings regarding the same are applicable to other types of applications and mobile advertising identifiers (MAIDs), which may include Apple IDFA, Google AdID, etc. As discussed herein, multiple different types of identifiers (e.g., browser identifier(s), device identifier(s), etc.) may be generated and associated together. For example, a particular device may be used to access a uniform resource locator (URL) via a browser application. Such a browser may send such request to an associated web server (e.g., server 130), receive responsive data (e.g., webpage file with references to other files to download), and use such responsive data to render and display the requested webpage. Webpage files that may be downloaded to the user device 120 may include not only files corresponding to content that is actually displayed as part of the webpage, but also associated files.

Server 130, identifier server 140, and service providers 150 may include any type of server or other computing device as is known in the art, including standard hardware computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server.

Server 130 may be any kind of server used to host web and other online content, including any type of webpage or website data. The particular files associated with each website may be controlled by a publisher (or designated administrator). The website file may include links to files under control by other parties. In that regard, the website files downloaded from server 130 may include a reference (e.g., URL) to an identifier object, as well as an optional loader application (e.g., Javascript commands) and associated code library to be used with the identifier object. Such identifier object may be specific to the website. For example, an identifier for a particular website may include or otherwise be based on a domain (or other characteristic) of that website. As such, each website visited by a particular user device using a particular browser (or other application) may be associated with a unique and different identifier.

A browser identifier may be associated with different browser sessions on a device. Because different browser and different browser sessions may be used on the same device, various indicators (e.g., timestamp) may be used to associate such different browsers and sessions to a common device. Further, each session may likewise be associated with certain identifiers, including TLS session identifier, TLS session ticket, etc., as discussed below. Over time, a specific browser of a specific device may be assigned different browser identifiers over time, and such browser identifiers may be mapped based on certain common indicators so as to identify that such browser identifiers are associated with the same browser.

The identifier server 140 may further be able to draw associations between the various identifiers (e.g., session identifiers, browser identifiers, device identifiers). In this regard, a particular user device 120 (as identified by a device identifier) may be associated with one or more sessions and browsers (or other applications). The identifier server 140 may therefore be capable of identifying one or more such identifiers (whether website, browser, session, or device) based on examination of received data packets. The identifier server 140 may store associations between various indicators by creating and updating tables. For example, secure sessions (e.g., secure socket layer (SSL)/transport layer security (TLS) sessions) may allow for session resumption, which occurs where a client and server negotiates SSL information and then later reuses that negotiated SSL information for future connections. SSL session setup is generally very time-consuming, so not having to renegotiate is therefore desirable. In order to resume a session, a client must be able to identify the session. SSL/TLS session IDs and/or TLS session tickets are two mechanisms that allow for the identification and resumption of a previously selected session.

The identifier server 140 may be called when a browser visits websites with certain scripts (e.g., that call on the domain of the identifier server 140). The identifier server 140 may therefore be able to receive session resumption data when a particular website is accessed. As such, such identifier server 140 may use such session information to determine when multiple connections are using the same TLS session as indicated, for example, by the same SSL session ID. Thus, the identifier server 140 can assign the same browser ID to multiple sessions or map different browser IDs associated with the multiple connections together. Such a map constructed by the identifier server 140 allows for creation of a persistent set of indicators that can be used to recognize a browser in future connections even when there is no existing SSL session that is being resumed.

Additional indicators may be based on use of transmission control protocol (TCP) information. TCP is used by a variety of Internet-based applications, including web browsers, email, and other applications. Information associated with use of TCP by a particular device (e.g., present in a TCP packet) may be inclusive or indicative of various timestamp information. Other time-related information may be associated with a TCP packet, including current time, uptime (or epoch time), and clock skew. In an exemplary embodiment, the identifier server 140 may receive a packet (e.g., associated with TCP timestamp information, such as a particular current time, uptime (or epoch time), source IP address, clock skew) of a selected session, determine whether the associated timestamp information (e.g., epoch time) of a packet matches any timestamp information of a previously received packet that may be associated with a selected session, and if so, drawing an association between the sessions. Further, a stored packet list may be maintained with associated identifiers or other indicators that may be used to make associations among different identifiers (e.g., different device identifiers for the same device) or to assign the same identifier to different session.

While client timestamp is generally included in the TCP packet and server timestamp is generally added automatically when the TCP packet is received by the server, further calculations may also be applied to determine other timestamp related information (e.g., epoch time and clock skew). The client timestamp, for example, provides a measure of time typically reflective of the elapsed time since a computing device was started and continuously working. Especially when combined with other indicators (e.g., clock skew), the calculated epoch time (when the device was last started) may be able to uniquely identify a particular device as all packets for that device received within some window of time of each other would share the same calculated epoch time. With respect to client timestamp, a device may record and report an elapsed time since the last time the device was started or the elapsed time was reset. That elapsed time may reset based on different schedules for different computing devices (e.g., some devices reset every few days and others reset every few weeks). Elapsed time may increment with a different granularity for different devices and operating systems. The granularity of the increment is measured in ticks. A tick may also represent a different amount of time for different systems, so there may be some device-specific calculations involved to determine type of device by determining the amount of time represented by a tick. The result is a timestamp that is incrementing consistently. Calculating that backwards provides the epoch time, which may be the time the device was last started or the last time the timestamp was reset. As such, the epoch time generally remains the same even elapsed time increases, until such time that the timestamp is reset.

Such indicators used by identifier server 140 may therefore include session identifiers (e.g., transport layer security (TLS), secure sockets layer (SSL)), transmission control protocol (TCP) identifiers (e.g., epoch time, current time, clock skew), internet protocol (IP) address, user agent identifiers, and others. Such indicators may be used individually or in any combination (e.g., SSL session identifier and TCP timestamp) to identify a particular common browser and/or a particular user device 120 based on common matches. An exemplary embodiment may select a certain set of indicators based on their respective deterministic value in identifying connections between identifiers for different browsers or devices. For example, a SSL session identifier is unique to a collection of one or more sessions and can therefore be used to associate different browser identifiers for the same browser together, as well as to assign the same browser identifier to different sessions associated with the same browser and device. Likewise, the combination of current time, epoch time, clock skew, and source IP address is unique to a particular device, thereby allowing for connections to be drawn between different identifiers associated with the device.

For example, a particular request to download website may refer to an identifier that is associated with one or more indicators (e.g., SSL session identifier). Such SSL session identifier may be compared to stored information and determined by identifier server 140 as having been previously used in conjunction with the same or different browser identifier and/or device identifier. Likewise, an epoch time associated with the requesting computing device may be determined by identifier server 140 as having been previously identified or used in conjunction with the same or other browser identifiers and/or device identifiers. The browser identifier—which may be associated with the timestamp and/or device identifier—may be encrypted, and unauthorized parties may therefore be unable to access, view or decrypt such encrypted information.

Information regarding identifiers may be stored in a table, which may further include a list of identifiers determined to be associated with the same browser, application, session, or device. Where no stored table existed for the referenced identifier (or any of its associated indicators or identifiers), a new table may be created. Where a stored table does exist, such stored table may be updated. As such, tables having one or more of these identifiers may be created and updated based on newly incoming identifiers (associated with certain indicators) and matches with stored identifiers (associated with the same or different indicators). When the identifier server 140 finds that two different identifiers have the same indicator (e.g., SSL session identifier), for example, the identifier server 140 may determine that the respective sessions are originating from the same device. The lifespans, availability, and uniqueness of each indicator may vary across different browsers, user agents, and/or operating systems. As such, indicators may be used in combination to exclude certain devices, for example, thereby facilitating the search for a match.

In some embodiments, a first party cookie—which may include a token or container of encrypted identifier(s) and associated information—may be used to store the persistent identifier for each website on the browser. Although such a cookie may persist for a time, such cookie may be changed periodically, as well as re-encrypted to prevent the encrypted identifier itself from being used as an identifier by unauthorized parties. Thereafter, various matching parameters (e.g., SSL and epoch time) may be used to identify and to draw associated cookies together as described in further detail below. In that regard, the identifier server 140 should be understood as having the ability to use any persistent identifier to associate to other persistent identifiers. Over time, therefore, the tables constructed by the identifier server 140 may grow to identify new connections and associations between various identifiers.

Service providers 150 may include servers or other computing devices that may provide various services based on identification of a browser. For example, a service provider 140 may use information regarding repeat visits to provide targeted advertising to repeat visitors (versus first-time visitors).

Figure 2:
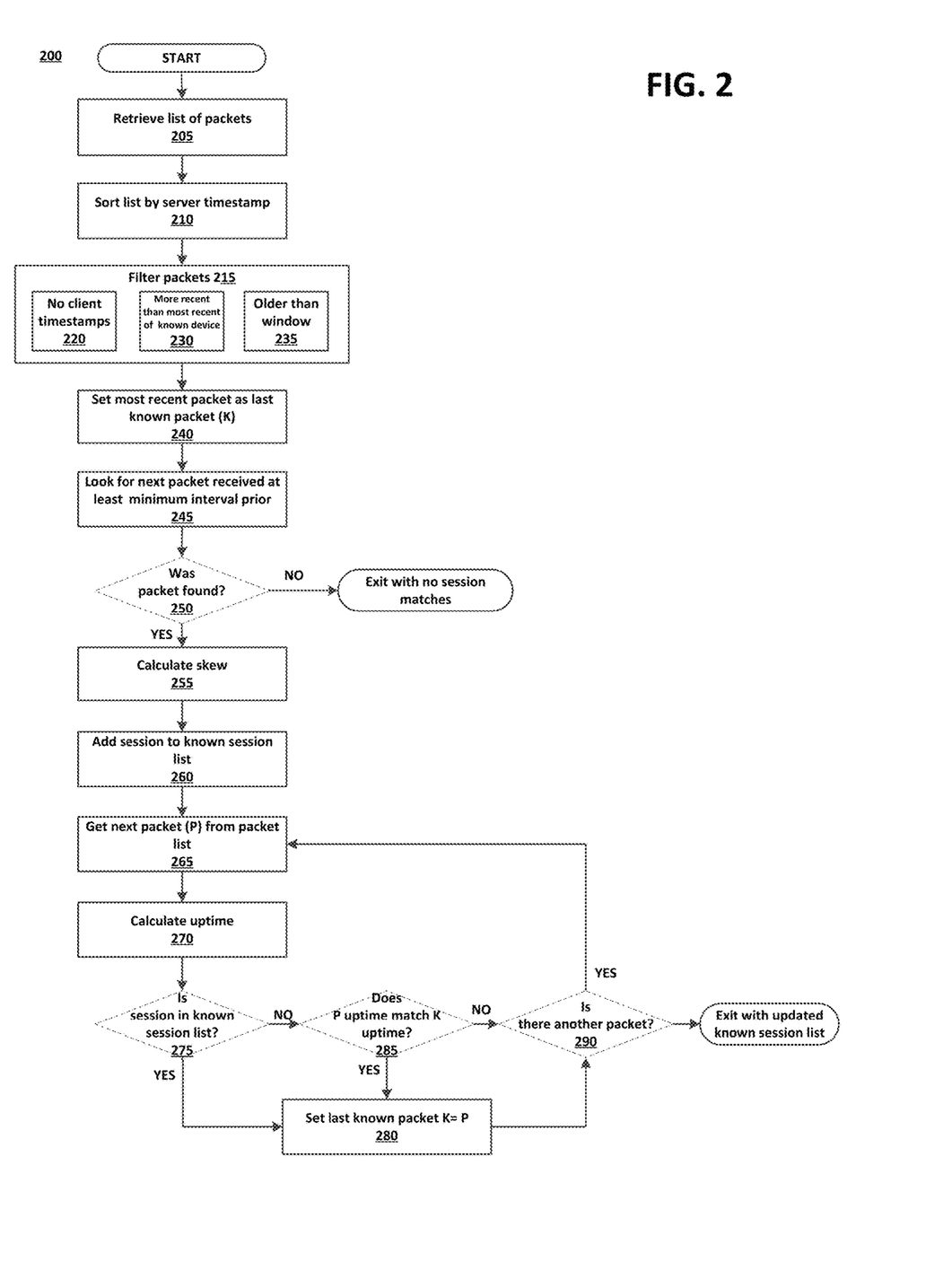
FIG. 2 is a flowchart illustrating a method for timestamp-based session association.

FIG. 2 is a flowchart illustrating an exemplary method 200 for timestamp-based session association. The method 200 of FIG. 2 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 2 (and the order thereof) are exemplary and may include various alternatives, equivalents, or derivations thereof including but not limited to the order of execution of the same.

Method 200 may be used to allow for timestamp-based session association despite various network anomalies and inconsistencies that may occur over time. When network jitter is present, data packets sent from the same device 120 may experience variations in timestamp data. Timestamp-based metrics—including skew—may therefore seem to vary. To compensate for such irregularities, method 200 may evaluate packets that are received over time. Such packets may be associated with a unique identifier for a session of a device 120. Identifying epoch time matches may then allow for identification that multiple sessions belong to the same device 120 (e.g., based on common epoch times) despite being associated with different device identifiers, browser identifiers, TLS Session IDs, user agents, etc. Although the steps are illustrated and described in sequence, some steps may be performed concurrently or in a different order.

In step 205, data packets may be retrieved from a data store for a predefined window of time (e.g., last 24 hours of a current session). Data packets may be sent from one or more of the user devices 120A-D operating a network-enabled application, such as a browser, and are received and captured at identifier server 140. Over the course of the predefined window of time, further, data packets associated with different sessions may have been received. The retrieved data packets may have been identified as likely to be associated with the same address based on various matching identifiers, including IP address, port, computing device timestamp, server timestamp, device identifier, browser identifier, user agent, operating system and version, session identifier (and/or other session information, including ticket, start time), and other information. The period of time during which the data packets are captured may be configurable.

In step 210, the retrieved data packets may be sorted by time of receipt (e.g., from most recently received to oldest) as indicated by the server timestamp.

In step 215, the set of packets being evaluated may be filtered based on various factors, including session, device of origin, time of receipt (e.g., last 24 hours), etc. In addition to removing packets that may not be useful for identifying associations to the same device, filtering for certain factors may result in identifying a set of packets as likely to be associated with the same device. Data packets not meeting the parameters of interest may be discarded from further evaluation. For example, in step 220, data packets may be filtered out based on not having any timestamp information. Further, the set of packets may be refined based on time of receipt in steps 230 (too recent) and 235 (too old).

In some embodiments, packets may also be discarded from evaluation for being outliers. Further, anomalies may arise when a computing device goes into sleep mode during which the clock may run much more slowly. Outlier packets may be identified based on falling into a predetermined percentile (e.g., 95th percentile) with respect to difference between computing device timestamps and server timestamps. If the difference is much larger than expected (e.g., 95th percentile), for example, the packet may not be selected for inclusion in calculations and comparisons.

After the list of packets has been filtered, two packets are selected for analysis with respect to skew. Because network latency may not be constant, selecting different sets of packets may result in different skew values due to variations in when the server receives a packet (which results in variable differences between computing device timestamp and server timestamps). The selected packets may be the most recently received packet and the next most recently received packet that was received at least a predetermined time period (e.g., at least one second) from receipt of the most recently received packet. In other implementations, the most recently received packet and the oldest received packet may be selected.

In step 240, the most recently received packet in the retrieved list is set as the last known packet. In step 245, the next most recently received packet may be searched for that was received at least a predetermined minimum of time (e.g., at least one second later) from receipt of the last known packet. In step 250, it may be determined whether the next packet was found. If not, the method exits without any device matches. If the next packet was found, the method process to step 255.

In step 255, a skew may be calculated. To calculate the skew, the data packets received from the same session or identifier may be further analyzed together (e.g., two data packets received at least a predetermined time interval apart). Each data packet is associated with a computing device (client) timestamp and a server timestamp. The computing device timestamp is placed in the packet by the computing device 120 under TCP protocol. The computing device timestamp represents an amount of time since the computing device was restarted (or the timestamp reached is maximum value and rolled over). The server timestamp is the actual time that the packet was received according to the server clock. In general, both the server timestamp and the computing device timestamp advance consistently over time, although the device timestamp may exhibit more drift (as servers may be subject to timestamp adjustments that reduce or eliminate the effects of such drift).

As described, skew may represent the speed at which a client (e.g., computing device) clock is incrementing in comparison to a server clock. As such, a skew value may be a difference in the rate of advance of the client timestamp and the server timestamp, which may be due to differences in CPU architecture, clock speed, and other differences between the client and the server. Skew may be calculated as follows:

$$skew=(p1c\_ts-p2.c\_ts)/(p1s\_ts-p2.s\_ts)$$

where p1s_ts is the server timestamp of a first selected data packet (e.g., most recently received within time window), p.2s_ts is the server timestamp of the second selected data packet (e.g., received at least a predetermined time before the first packet), p1c_ts is the computing device timestamp of the first packet, and p2.c_ts is the computing device timestamp of the second data packet.

In step 260, the session identifier associated with the last known packet may be added to the known session list, and in step 265, the next packet in the retrieved list may be evaluated.

In step 270, an epoch time may be calculated for each packet. As described, epoch time represents an amount of time since the client (e.g., computing device) timestamp was at zero. Such epoch time may be calculated as follows:

$$\text{Epoch time}=s\_ts-(c\_ts/skew)$$

where skew is calculated as discussed above with respect in step 255. Following performance of step 270, each data packet being evaluated may be associated with an epoch time. In some embodiments, the first packet in the set (e.g., where there is no previously received packet) may simply be assigned the first epoch time. Further, in some implementations, skew may be calculated for different sets of packets and then averaged for use in calculating epoch time.

In step 275, it may be determined whether the session identifier associated with the next packet is found in the known session list. If yes, the method proceeds to step 280, in which the next packet is designated the last known packet. If the session identifier associated with the next packet is not found in the known session list, the method proceeds to step 285, in which it may be determined whether the epoch time of the next packet matches the epoch time of the last known packet. A match may be found when two epoch time values are within a predefined range. As such, minor variations may nevertheless result in a match. In some embodiments, the epoch time from the current session may be compared to the last epoch time that is known to match. Subsequent matches may use the most recent epoch time for matches, because epoch time may exhibit some change due to drift over time. Allowing a predefined range, and using the most recent epoch time may therefore compensate for any drift.

A match indicates that the associated data packets likely originated from the same device. If an epoch time match is found, the method proceeds to step 280, in which the next packet is designated the last known packet. From step 280 and where the epoch times do not match, the method proceeds to step 290, in which it may be determined whether there is another packet in the retrieved list. If yes, the method reverts back to step 265, in which another next packet in the list may be obtained for evaluation. If there is no other packet in the list, the method may exit with an updated known session list, which may be used to update various databases with respect to the newly determined matches between different session identifiers. Such updates may include merging of various fields (e.g., in stored table) to include information regarding the data packets having an epoch time matching a primary epoch time associated with the stored table, which may be associated with a device identifier. As such, multiple identifiers may be determined to be associated with the same device, and information regarding the different identifiers may be incorporate or otherwise merged into a combined record that corresponds to a common device.

A primary device identifier may be designated. Where multiple identifiers have been assigned to a device, one identifier may be selected to be designated as the primary identifier for the table. For example, the most recently assigned device identifier associated with the device may be designated as the primary identifier, which may then be associated with subsequently assigned secondary identifiers. As such, the primary identifier associated with a specific device may be maintained and updated (e.g., re-encrypted) as necessary in light of network anomalies and jitter effects. In subsequent interactions involving one of the associated secondary identifiers, for example, the (encrypted) primary identifier may be exchanged via an encrypted identifier container or token.

The method 200 may be iterated:
k=n (set the known packet as the first packet)
sessionList.push(packet(k). sessionid)
n=n+1 (increment the packet index)
while n<packetList.length (there are more packets to process)
  if packet(n).sessionid is in sessionList
  k=n (make this our last known packet)
  else
  if packet(n).epochtime matches* packet(k).epochtime
    k=n (make this our last known packet)
      append packet(n).deviceid to sessionList (remember device)
  n=n+1 (increment the packet index)
where n is the index of the packet in the array, k is the index of the last packet for the known device, sessionList is a list of all session that have been determined to be the same device as the initial known session (including the initial known session to start), and matches refers to values that are within a predetermined, configurable time period.

Some embodiments may include generating mutable and immutable browser identifiers and mapping the immutable and browser identifiers to each other based on indicators (e.g., epoch time) of common session and/or device. As indicated by their respective names, an immutable browser identifier does not change, while a mutable browser identifier may change. An immutable browser identifier may be associated or mapped to different mutable browser identifiers. Because a mutable browser identifier may change, various indicators associated with a referenced mutable browser identifier may be used to map that referenced browser identifier to the immutable browser identifier, its associated mutable browser identifiers, and/or an associated device identifier.

A mutable browser identifier object may be stored in any type of file that may be maintained in local browser memory storage, including stylesheets, JavaScript files, HTML files, text files, AJAX requests, image files, cookies, etc. Such mutable browser identifier object may allow for its content (including the mutable browser identifier, whether unique or non-unique) to be accessible to the browser and related browser applications (including a loader application). As such, the browser and related browser applications may access and use the encrypted identifier for various operations, including logging activity.

A mutable browser identifier object may include a mutable browser identifier, which may be unique to the webpage. In some cases, the user may opt out of being provided with a unique mutable browser identifier. In such cases, a new mutable browser identifier object may be generated with a non-unique term as the mutable browser identifier. Alternatively, the mutable browser identifier object may be updated to replace the unique identifier with a non-unique term (or an opt-out identifier for defined or general opt-out). As such, a mutable browser identifier may not be provided to the browser for storage in some instances. Alternatively, a mutable browser identifier may be provided that can only be decrypted at the identifier server 140. Separately, a non-unique mutable or immutable identifier may be provided that indicates that the user opted out of unique identifier use.

In some embodiments, the mutable browser identifier object may further include other types of information regarding user preferences (as designated by the user), including information regarding user opt-outs or opt-ins for specific webpages, websites, vendors, or specific types of data use. As the user changes their opt-out or opt-in settings, such information may be used to update a mutable browser identifier object. The browser may then be directed to reload the mutable browser identifier object into the local browser storage, thereby implementing the updated user settings.

Figure 3:
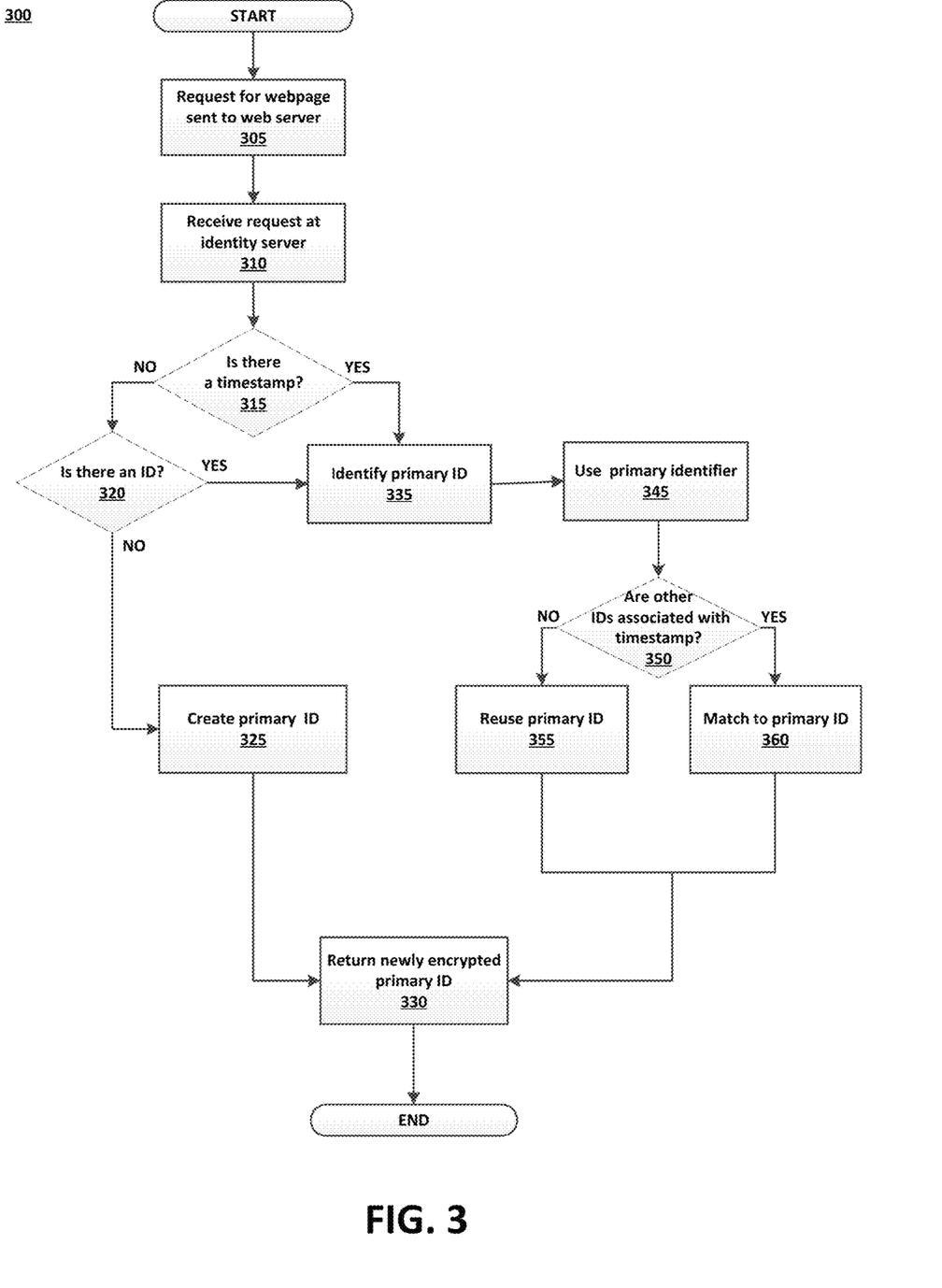
FIG. 3 is a flowchart illustrating an exemplary method for timestamp-based matching of encrypted identifiers.

FIG. 3 is a flowchart illustrating an exemplary method 300 for timestamp-based matching of identifiers. In method 300 of FIG. 3, identifier information may be stored in memory of an identifier server 140, a reference to a browser identifier may be received, and it may be determined whether there is a timestamp and IP address associated with the referenced browser identifier. If not, the method may proceed to determine whether the referenced identifier corresponds to a device identifier, and if not, a device identifier may be created and encrypted in conjunction with one or more other identifiers and related data (e.g., in an encrypted container or token). The referenced identifier may also be decrypted to provide one or more identifiers (e.g., device, browsers, and/or websites). Stored information associated with the corresponding stored identifier may be updated based on the device identifier (and its associated information) and associated browser identifier and other associated identifiers.

If there is no reference browser identifier but there is a matching epoch time, the identifier associated with the matching epoch time of the current session may be encrypted and returned to the browser. If there is there is a reference identifier that has a matching epoch time associated with a different identifier, one may be selected as the primary identifier. That primary identifier may be returned (in encrypted form) to the browser. If the reference Identifier has no matching epoch time, the same reference identifier may be returned (in re-encrypted form). If the reference identifier is the same as an identifier associated with a matching epoch time, the same identifier may be returned (in encrypted form). In all cases, the identifier that is being returned is encrypted (or re-encrypted) using a new encryption key so as to always be different than the reference encrypted identifier.

In step 305, identifier information may be stored in local browser storage for a website. Such identifier information may be provided by an identifier server 140 that keeps track of multiple different mutable browser identifiers, immutable browser identifiers, and device identifiers, as well as correlations among such identifiers. For example, a particular device identifier may be associated with one or more mutable browser identifiers and immutable browser identifiers. Such maps may have been generated based on previously received information regarding such associations (e.g., previously received browser identifiers mapped to a particular common device identifier), as well as updated over time. Such updates may include not only creating new associations based on newly received association data, but also updating stored associations based on any matches to the newly received information. In some embodiments, a container or token may be generated based on an assigned device identifier, browser identifier, and associated metadata and other information.

In some embodiments, the mutable browser identifier may be stored in an encrypted container. One specific example may be referenced herein as an encrypted identifier (EID) container. Such EID container may be stored in local browser storage in association with an executed script (e.g., in the name space of each participating website such as webpage 410 of FIG. 4). Such EID container may have been generated (and/or updated) by an identifier server 140 and placed on the website by a publisher, whether via a tag manager or header bidding integration (e.g., prebid.js). In some embodiments, the EID container may be stored as a cookie (e.g., named_parrable_id or a different name).

In step 310, a request may be received at identifier server 140 from the browser of a user device 120. Such request may be automatically sent by the browser in association with a request for a particular website (e.g., as identified by a URL) that may be entered by the user of the user device 120, which may send such request to the server 130 associated with the website. The server 130 provides website content to the browser of user device 120. Such website content may be associated with the reference to a browser identifier object. Such a reference may be another URL that resolves to identifier server 140. In some embodiments, the reference sent by the server 130 may pertain to a loader application that is executable to reference the browser identifier object. In some instances, the browser may check local browser storage to find the referenced browser identifier object that may already have been downloaded previously.

Following such checking of the local browser storage, the user device 120 may send a request to an identifier server 140 associated with the referenced mutable browser identifier object. Such request may be indicative of whether the referenced mutable browser identifier object was found in the local browser storage (and if so, when the referenced mutable browser identifier object had been created). Where the request indicates that the referenced mutable browser identifier object was not found in the local browser storage, the identifier server 140 may follow the workflow that includes generating a new mutable browser identifier object to the user device 120. As noted above, the new mutable browser identifier may be generated so as to be unique to the particular website being downloaded (e.g., based on website domain or other characteristic).

In step 315, it is determined whether a timestamp (e.g., TCP timestamp) is associated with the request received in step 310. If not, the method proceeds to step 320, and if yes, the method proceeds to step 335. As discussed above, a timestamp (including epoch time or uptime) may be associated with each data packet received by identifier server 140. The timestamp may be used by the identifier server 140 to match the current set of data packets from a particular device to packets previously received in a past session or different browser. For example, the identifier server 140 may further be able to match mutable browser identifiers to a common immutable browser identifier, as well as to a common device identifier. In this regard, a particular user device 120 (as identified by a device identifier) may be associated with one or more browsers (as identified by a respective immutable browser identifier), each of which may be associated with one or more websites (as identified by a respective mutable browser identifier). The identifier server 140 may therefore be capable of identifying one or more such identifiers (whether website, browser, or device) when a user device requests a website using particular browser, as well as maintaining and updating maps regarding which identifiers are associated with each other.

In step 320, it is determined whether the current packets are associated with a device identifier. Where the browser provides an EID, the identifier server 140 may access the device identifier within an EID container by decrypting the EID container. The decrypted EID container may then yield a device identifier, as well as associated browser identifiers and related metadata and information.

If the packets are not associated with any device identifier, the method may proceed to step 325 for generation of a new (primary) device identifier. In that regard, the identifier server 140 may generate and provide a new unique mutable browser identifier upon request. Such a unique mutable browser identifier may be specific to the website making the request. Where the user may have opted out, however, a non-unique term may be inserted in place of the unique mutable browser identifier. In some embodiments, the user may opt out of being provided with unique identifiers with respect to a designated webpage or website. Alternatively, the user may opt into being provided with unique identifiers with respect to a designated webpage or website. As such, the website may be uniquely identified via the unique mutable browser identifier for some webpages, but not others. In some embodiments, such information regarding user opt-outs or opt-ins may be reflected in the mutable browser identifier object. For example, the mutable browser identifier object may include information indicative of the user opt-in or opt-out for defined webpages, websites, or categories of websites, as well as indicators specifying the granular details under which the opt-in or opt-out are to be implemented.

The user may also opt to reset the unique mutable browser identifier associated with the website. Resetting the unique mutable browser identifier may involve clearing the local browser storage of any previously downloaded mutable browser identifier objects, generating a new mutable browser identifier (in a new mutable browser identifier object), and providing the new mutable browser identifier object, which may then be stored in the local browser storage. In some embodiments, a signal may be sent to the identifier server 140 to indicate that the mutable browser identifier object needs to be updated. Such a signal may be implemented in a cookie that the identifier server 140 can read and then determine what to send back as the mutable browser identifier object. Alternatively, the request (including pass information or parameters) may be directed to a transient URL (e.g., that is structured to include the mutable browser identifier and any directives), and that request may then be redirected to the identifier server 140, which can then look at the referrer header (e.g., transient URL) of the request to parse out the requested changes to the mutable browser identifier object.

Further, the identifier server 140 may provide a plurality of mutable browser identifiers (each to a different website and provided in a different mutable browser identifier object). Activity at the user device 120 in relation to the website may thereafter be associated with the provided unique mutable browser identifier. Such mutable browser identifier may further be associated with immutable browser and/or device identifiers, thereby allowing for the ability to distinguish between different browsers on the same or different computing devices in some cases. Specifically, information may be logged regarding activity at a particular website (as identified by a unique mutable browser identifier), which may be provided to identifier server 140 (or an associated server) by a loader application at the user device 120. In that regard, the identifier server 140 may not receive the mutable browser identifier itself, as the mutable browser identifier may only be called by local applications or code (e.g., browser, loader application, local code library) resident on the user device 120. The loader application may be executed to perform a variety of functions, which may include loading and executing code from the code library. Such a code library may be provided, modified, and updated at the web server 130, identifier server 140, or other designated service provider 150.

In some embodiments, the browser may not necessarily request that the identifier server 140 validate the referenced mutable browser identifier object. In such instances, the browser may use the stored mutable browser identifier object without making any request to the identifier server 140. Because the identifier server 140 provides the mutable browser identifier in encrypted (or re-encrypted) form, the browser may be provided with a different encrypted version of the mutable browser identifier in response to teach request. As discussed above, such encryption may be applied to a container that includes multiple different identifiers that are associated together and with other information. An example of one such encrypted identifier (EID) container may take the following form:

$$xx.yyyyyyyyyy.zzzzzzzzzzzzzzzzzzzz$$

xx=2 digit version indicator that may allow or addition of a conditional for encryption and decryption so as to be able to change versions.

yyyyyyyyyy=the timeIndex or 10 digit time stamp (without ms) that may be created in node.js as follows Math.trunc(Date.now( )/1000) and that may be used to lookup the encryption key.

zzzzzz . . . =encryption key whose length may vary.

The encrypted block of the EID container can further contain a variety of information. By storing information in the EID container, the browser may serve as a portal to distributed storage that only the identifier server 140 and authorized partners are able to decrypt. By providing encryption keys in near real-time, further, identifier server 140 can also turn off a bad actor or otherwise prevent bad actors from accessing the information in the EID container.

When the website is accessed by a device, a request may be sent by the browser having a reference to any existing EID container. A new EID container may be recreated (including by re-encryption) with every activation by a requested webpage view, thereby preventing any part of the EID container from being used as a stable identifier over time. The EID container may further specify a version identifier, and an encryption key index used to find the right key for the specified version. The version may be graded as part of the process in which an old version of the EID container may be discarded in favor of a new version.

Each time that the identifier is activated (e.g., through javascript or another mechanism in relation to a webpage view), a new EID container may be generated using a new encryption key. If two activations happened in the same second for the same browser on the same device on the same website, however, the same EID may be generated twice. Additionally, the version of the old EID container and new EID container may differ if the current version specified by an encryption service may have changed. By re-encrypting the EID container with a new encryption key at intervals or for each response, the contents of the EID container may be prevented from being used as a stable identifier, which assures that only those that can decrypt the EID container are able to access the identifiers contained therein.

As such, a device identifier is created to uniquely identify the computing device that referenced the browser identifier. In some embodiments, the device identifier may be associated with the browser identifier, as well as other related information, and packaged into an EID container. An exemplary process for creating such a container may include encoding the associated data, encrypting the encoded data, and building an encrypted identifier may include the following:
1. Provide validation portion to verify integrity of encrypted/decrypted data, which may include creating a buffer with 16 zeros (the AES-256 block size) to serve a similar function as cryptographic hash function (e.g., HMAC) used for decryption)
2. Convert the browser identifier created time to a 13 byte buffer and convert a universally unique identifier (UUID) of the browser identifier to a 16 byte buffer
3. Convert device identifier and device identifier created time accordingly
4. Concatenate the identifiers in that order into a block
5. Encrypt the block using AES265 and the encryption key that corresponds with time stamp (without ms) of the impression
6. Convert the encrypted text to a hex string
7. Prepend the version and the timeIndex In some embodiments, therefore the browser identifier may be associated with device identifier, along with additional data (e.g., creation dates), within the encrypted block or container. The version of the browser identifier may be used to determine and inform the encryption and decryption processes.

When identity server 140 receives a request from a browser (e.g., web page view), therefore, the identity server 140 may be activated to decrypt any EID container that is present in the request, as well as proceed with session matching as discussed earlier herein. A (re)encrypted EID container (encrypted with a new encryption key) is further returned to the requesting browser. The associated encryption key may thereafter be used to reverse the process for decryption and decoding by identity server 140 or by authorized partners. The 16 zeros may be used to test that the key used for decryption was valid. If decryption does not produce the 16 zeros, the encryption key may be invalid. In some instances, there may be heightened security risk, and an HMAC may be encrypted along with the browser identifier. The encryption keys used to encrypt (and decrypt) the identifiers may be pre-generated a certain time period (e.g., a week) in advance and stored. Generation of an encryption key may be based on cryptographic functions, which may be random.

If the packets are already associated with an identifier, the method may proceed to step 335. In step 335, the primary device identifier may be identified. In cases where the same timestamp may be associated with multiple different device identifiers, for example, one device identifier may be identified as the primary device identifier. Any other device identifiers may be designated as secondary device identifiers.

In step 345, the identified primary device identifier may thereafter be used to identify further matches. In step 350, it may be determined as to whether there are other matches associated with different sessions. Such matches may be identified, for example, by determining whether the epoch time associated with the selected primary device identifier matches the epoch time of packets in previous sessions. If there is no match, the method may proceed to step 355 in which the same primary identified may be used for step 330. In If there is a match, the method may proceed to step 360, which associates the identified matches to the primary device identifier.

As noted above, some indicators may have different deterministic value. While improbable, it is possible that two different computing devices may have the same epoch time. As such, the referenced browser identifier may be associated with a different computing device (having a different device identifier) than the computing device that that referenced the browser identifier. Conversely, the matching methodologies discussed herein also allow for different device identifiers to be identified as being associated with the same device.

In step 330, the primary device identifier—in conjunction with associated secondary and other identifiers and other information—may be encrypted (or re-encrypted) with a new encryption key. The newly-encrypted device identified, which may now be part of an EID container, may then be provided to the browser. As such, the browser may maintain the EID that includes a different version (encrypted with the different encryption key) of the device identifier associated with the particular device. As such, the activity of that device (e.g., across different browsers, sessions, and websites/applications) may be identified as belonging to a common device.

Figure 4:
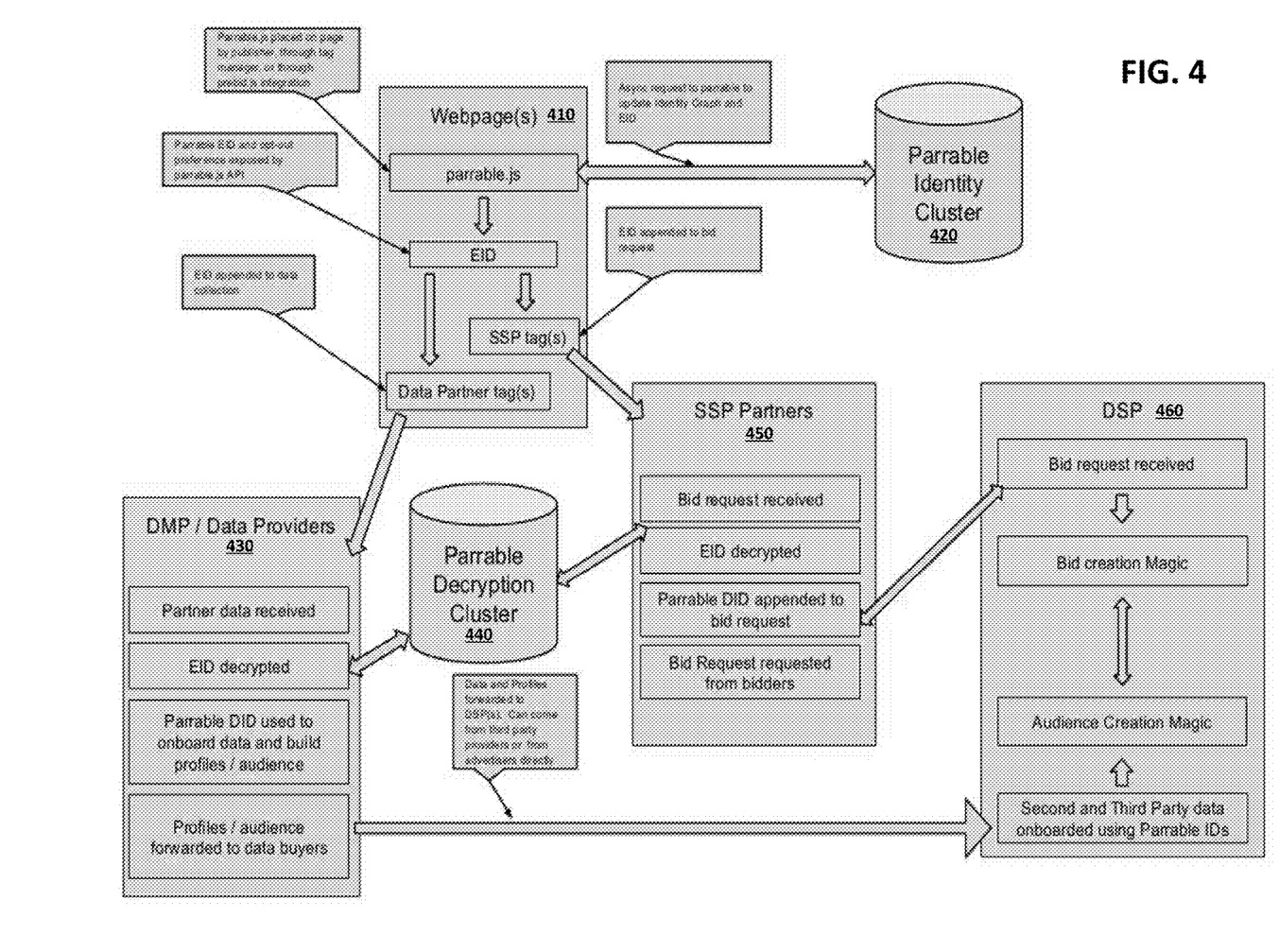
FIG. 4 is a diagram illustrating an exemplary system for assignment and use of encrypted identifiers.

FIG. 4 is a diagram illustrating an exemplary network environment in which a system for assignment and use of encrypted identifiers may be implemented. As illustrated, such a system may include identity cluster 420, data management platform (DMP)/data providers 430, decryption cluster 440, supply side platform (SSP) partners 450, and DSP 460.

In an exemplary implementation, a user request may be received via a browser concerning a webpage 410 from an identifier-enabled publisher. The browser may load the requested webpage 410, which may contains a script (e.g., parrable.js JavaScript) that is executable to send a request an identifier from identity cluster 420. Such identifier may include the encrypted identifier (EID) contained in a cookie that may be present (e.g., _parrable_id cookie). In some embodiments, such cookie may further include tags (e.g., data partner tags from data providers 430, SSP tags from SSP partners 450).

Decryption cluster 440 may then decrypt and decode the EID container, for example, be using the version of the EID container to determine how decryption and decoding are to be performed. The timestamp may be used to lookup the necessary encryption key. Once the browser identifier is decrypted, the identifier server 140 may perform the methods of FIG. 2 or FIG. 3 in order to determine other identifiers (e.g., mutable browser identifiers, other associated browser identifiers, device identifiers), as well as update associated tables and maps. The identifiers may be the same as those contained in the EID container (if one was provided) or may be different (e.g., if the algorithms determine that the identifiers need to be updated).

The identifiers may be encoded into a byte array, which may then be encrypted using the appropriate version and encryption key for the current second. The EID string may then be built to include the version, timeindex, and encrypted data, and the new EID container may be sent back to the browser. The browser may store the EID container locally, and when a new request is made regarding the webpage 410, the process may be repeated.

In addition, third party partners may be provided with the EID container to associate with different webpages, applications, etc. In addition, authorized parties may be allowed to decrypt the EID containers to access the encrypted identifiers contained within. The EID container may therefore be decrypted by parties with access to the encryption keys and algorithms, which may be accessed via a representational state transfer (REST) application programming interface (API)—or another type of API—associated with the identifier server 140. The decryption can take place through the REST service associated with the identifier server 140, or the parties may be provided with the decryption algorithms (and/or certificates, access keys, etc.) for integration into their respective systems. Such parties may further be provided with a feed of encryption keys (e.g., from identifier server 140 or related system).

DMP/data providers 430 may collect or otherwise receive data from various sources, associate data sets with respective EID containers, and profile activity associated with the EID containers. As such, DMP 430 may be permitted decrypt the encrypted browser identifier. A device identifier may be used to onboard data and build audience profiles. Such profiles may be provided to other parties (e.g., demand side platform (DSP) 460).

DSP 460 may be a different type of entity that interacts with both DMP 430 on behalf of SSP 430. For example, DSP 460 may place advertisement campaigns across different websites and applications, each of which may be associated with an EID container. Contextual data regarding the EID containers may include browsing history or other types of site or application activity, which may be indicative of demographic or other data useful for targeted advertising to audience segments. Conversely, DSP 460 may also assist website-affiliated entities to find appropriate advertising to place of their respective websites.

Meanwhile, SSP partners 450—which may include either the advertising entity or the website affiliated entity—may use the EID containers to provide DSPs 460 with information that will facilitate targeted placement. In an exemplary embodiment, an auction may be implemented in which the SSP 560 request bids associated with EID containers (e.g., indicative of browsing history types), which may be submitted by DSP 460. The bids may be automatically evaluated and matched in accordance with the EID containers and associated audience profiles. Such DMP 430 and SSP 450 may be authorized parties that may be provided with the ability to decrypt the EID container. Such parties may implement the encrypted identifier system described herein for the purpose of distinguishing unique impressions (e.g., by different browsers and devices).

In some embodiments, the EID container may not use AES256, but instead uses an algorithm, such as chacha20poly1035 and built in HMAC or another algorithm, which allow the decrypted data to be validated. Additionally, the new EID container may contain additional information beyond just the browser identifiers and creation dates. Key management may also be adjusted to use fewer keys, though a new key may be used for every second of the day to minimize the chance that the same EID container would occur twice.

Further embodiments may use an additional type of encrypted identifier for devices associated with users who have or have not consented to sharing their information, as well as specific permissions and restrictions regarding how such information is to be used. Such encryption may be restricted from being used by outside parties, as well as compliant with applicable privacy rules and regulations (e.g., California Consumer Privacy Act (CCPA), (GDPR)).

Figure 5:
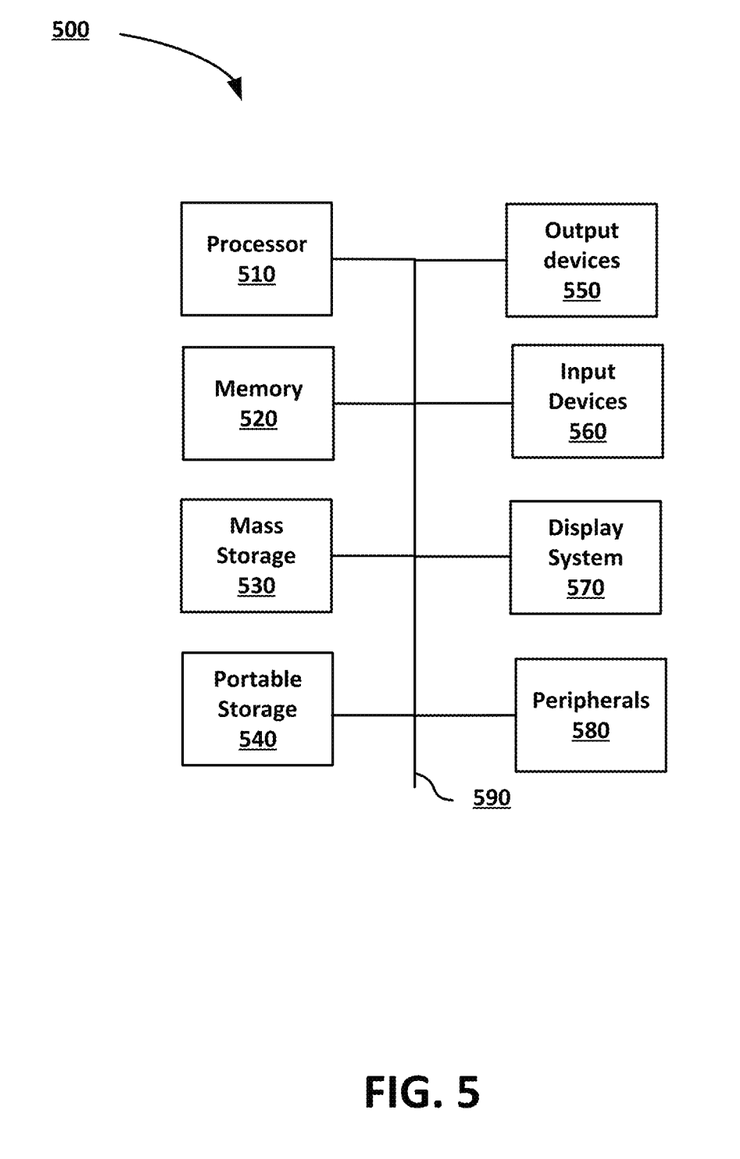
FIG. 5 illustrates an exemplary computing system that may be used to implement an embodiment of the present invention.

FIG. 5 illustrates an exemplary computing system 500 that may be used to implement an embodiment of the present invention. System 500 of FIG. 5 may be implemented in the contexts of the likes of user devices 120A-D, server 130, identifier server 140, and service provider 150. The computing system 500 of FIG. 5 includes one or more processors 510 and memory 510. Main memory 510 stores, in part, instructions and data for execution by processor 510. Main memory 510 can store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. However, the components may be connected through one or more data transport means. For example, processor unit 510 and main memory 510 may be connected via a local microprocessor bus 590, and the mass storage device 530, peripheral device(s) 580, portable storage device 540, and display system 570 may be connected via one or more input/output (I/O) buses 590.

Mass storage device 530, which may be implemented with a magnetic disk drive or an optical disk drive, is a non-volatile storage device for storing data and instructions for use by processor unit 510. Mass storage device 530 can store the system software for implementing embodiments of the present invention for purposes of loading that software into main memory 510.

Portable storage device 540 operates in conjunction with a portable non-volatile storage medium, such as a floppy disk, compact disk (CD) or digital video disc (DVD), to input and output data and code to and from the computer system 500 of FIG. 5. The system software for implementing embodiments of the present invention may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD) or other suitable display device. Display system 570 receives textual and graphical information, and processes the information for output to the display device.

Peripherals 580 may include any type of computer support device to add additional functionality to the computer system. For example, peripheral device(s) 580 may include a modem or a router.

The components contained in the computer system 500 of FIG. 5 are those typically found in computer systems that may be suitable for use with embodiments of the present invention and are intended to represent a broad category of such computer components that are well known in the art. Thus, the computer system 500 of FIG. 5 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus (e.g., bus 590) carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for associating sessions based on timestamp data, the method comprising:
retrieving a collection of data packets received during one or more sessions between a client device and a server computing device within a time period, each packet in the collection of data packets associated with an encrypted identifier unique to a respective session;
decrypting the encrypted identifier of each of the data packets based on an encryption key specific to a respective version indicator;
calculating an epoch time associated with the respective decrypted identifier of the retrieved data packets, wherein the epoch time is indicative of a last time that a respective timestamp of a respective one of the data packets was reset, and wherein calculating the epoch time is based on the determined skew and respective server timestamp information of the data packet;
identifying whether each of the calculated epoch times matches a previously calculated epoch time for a packet associated with a previously selected session; and
updating a stored list of sessions associated with the client device based on one or more identified matches between the respective calculated epoch time and the previously calculated epoch time, wherein each of the sessions on the updated list is associated with a respective set of one or more identifiers.

2. The method of claim 1, wherein a plurality of calculated epoch times are associated with the client device, and wherein the match is based on a most recent one of the calculated epoch times.

3. The method of claim 1, wherein identifying the matches is based on whether each of the calculated epoch times is within a predefined range of the previously calculated epoch time.

4. The method of claim 1, further comprising updating one or more databases based on the updated list of sessions.

5. The method of claim 1, further comprising filtering the collection of data packets based on time of receipt, wherein the decrypted data packets are selected from a filtered set of the data packets.

6. The method of claim 1, wherein the encrypted identifier is part of a container or token that further includes one or more secondary identifiers.

7. The method of claim 1, further comprising re-encrypting the decrypted identifier using a new encryption key.

8. The method of claim 1, wherein the encrypted identifier is associated with a set of permissions or restrictions.

9. A system for associating sessions based on timestamp data, the system comprising:
memory that stores a list of sessions associated with a client device;
a communication interface that receives a collection of data packets during one or more sessions between the client device and a server computing device within a time period, each packet in the collection of data packets associated with an encrypted identifier unique to a respective session; and
a processor that executes instructions stored in memory, wherein the processor executes the instructions to:
decrypt the encrypted identifier of each of the data packets based on an encryption key specific to a respective version indicator,
calculate an epoch time associated with the respective decrypted identifier of the retrieved data packets, wherein the epoch time is indicative of a last time that a respective timestamp of a respective one of the data packets was reset to zero, and wherein calculating the epoch time is based on the determined skew and respective server timestamp information of the data packet,
identify whether each of the calculated epoch times matches a previously calculated epoch time for a packet associated with a previously selected session, and
update the stored list of sessions associated with the client device based on one or more identified matches between the respective calculated epoch time and the previously calculated epoch time, wherein each of the sessions on the updated list is associated with a respective set of one or more identifiers.

10. The system of claim 9, wherein a plurality of calculated epoch times are associated with the client device, and wherein the match is based on a most recent one of the calculated epoch times.

11. The system of claim 9, wherein the processor identifies the matches based on whether each of the calculated epoch times is within a predefined range of the previously calculated epoch time.

12. The system of claim 9, wherein the communication interface further update one or more databases based on the updated list of sessions.

13. The system of claim 9, wherein the processor executes further instructions to filter the collection of data packets based on time of receipt, wherein the decrypted data packets are selected from a filtered set of the data packets.

14. The system of claim 9, wherein the encrypted identifier is part of a container or token that further includes one or more secondary identifiers.

15. The system of claim 9, wherein the processor executes further instructions to re-encrypt the decrypted identifier using a new encryption key.

16. The system of claim 9, wherein the encrypted identifier is associated with a set of permissions or restrictions.

17. A non-transitory, computer-readable storage medium, having embodied thereon a program executable by a processor to perform a method for associating sessions based on timestamp data, the method comprising:
  retrieving a collection of data packets received during one or more sessions between a client device and a server computing device within a time period, each packet in the collection of data packets associated with an encrypted identifier unique to a respective session;
  decrypting the encrypted identifier of each of the data packets based on an encryption key specific to a respective version indicator;
  calculating an epoch time associated with the respective decrypted identifier of the retrieved data packets, wherein the epoch time is indicative of a last time that a respective timestamp of a respective one of the data packets was reset to zero, and wherein calculating the epoch time is based on the determined skew and respective server timestamp information of the data packet;
  identifying whether each of the calculated epoch times matches a previously calculated epoch time for a packet associated with a previously selected session; and
  updating a stored list of sessions associated with the client device based on one or more identified matches between the respective calculated epoch time and the previously calculated epoch time, wherein each of the sessions on the updated list is associated with a respective set of one or more identifiers.

* * * * *